United States Patent [19]

Saitoh et al.

[11] 4,022,869
[45] May 10, 1977

[54] METHOD FOR REMOVING HYDROGEN CHLORIDE FROM EXHAUST GAS CONTAINING SAME

[75] Inventors: Shigeru Saitoh; Tetsuya Watanabe; Katsutoshi Komahashi, all of Iwaki, Japan

[73] Assignee: Kureha Kagaku Kogyo Kabushiki Kaisha, Tokyo, Japan

[22] Filed: Nov. 4, 1975

[21] Appl. No.: 628,659

[30] Foreign Application Priority Data

Nov. 15, 1974   Japan ............................ 49-131149
Apr. 14, 1975   Japan ............................ 50-44247

[52] U.S. Cl. ................................................ 423/240
[51] Int. Cl.² ...................................... B01D 53/34
[58] Field of Search ................ 423/240, 241, 497; 55/70, 71

[56] References Cited

UNITED STATES PATENTS

| 1,660,053 | 2/1928 | Smith | 423/497 |
| 3,810,970 | 5/1974 | McCormick | 423/497 X |
| 3,826,816 | 7/1974 | McCormick | 423/240 X |

*Primary Examiner*—Earl C. Thomas
*Attorney, Agent, or Firm*—Lane, Aitken, Dunner & Ziems

[57] ABSTRACT

Disclosed is a method for removing hydrogen chloride from an exhaust gas containing same without discharging any waste water from the system, which method includes bringing the exhaust gas into contact with a slurry containing calcium carbonate or calcium hydroxide to absorb the hydrogen chloride in the form of calcium chloride and then recovering the calcium chloride as solid calcium chloride hydrate.

3 Claims, 3 Drawing Figures

METHOD FOR REMOVING HYDROGEN CHLORIDE FROM EXHAUST GAS CONTAINING SAME

FIELD OF THE INVENTION

The present invention relates to a method for efficiently removing hydrogen chloride from an exhaust gas containing same without discharging any waste water out of the system by bringing the exhaust gas into contact with a slurry containing calcium carbonate or calcium hydroxide.

BACKGROUND OF THE INVENTION

In many cases, wastes or refuse, such as municipal refuse and industrial wastes, contain chlorine in the form of polyvinyl chloride resin wastes mixed in them. These chlorine-containing wastes emit exhaust gases containing hydrogen chloride when burned. For example, municipal refuse, when burned, emits an exhaust gas which usually contains 500 to 1000 ppm hydrogen chloride. Polyvinyl chloride resin wastes, when burned alone, also emit an exhaust gas which usually contains 2 to 3% hydrogen chloride. When such exhaust gases are discharged into the atmosphere without treatment a pollution problem arises. Therefore, it is necessary to remove hydrogen chloride from the exhaust gases, before they are discharged into the atmosphere.

Heretofore, in order to remove hydrogen chloride from exhaust gases, the so-called wet type gas purifying method has been adopted wherein the exhaust gases are brought into contact with water to absorb hydrogen chloride. In the wet-type method, the waste water containing absorbed hydrogen chloride is neutralized by adding thereto an inorganic compound such as calcium carbonate, and after neutralization, the waste water is discharged, for example, into sewage. However, where hydrogen chloride is removed from the exhaust gases by the wet scrubbing method, the waste water discharged into sewage contains a considerable amount of dissolved inorganic compounds. There is a fear of these inorganic compounds cause water pollution, though they are not directly harmful to aquatic life. The exhaust gases sometimes contain various heavy metal derived from the chlorine-containing wastes. When exhaust gases containing such heavy metals are treated according to the wet scrubbing method, therefore, these heavy metals result in water pollution. In view of these facts, it is desirable to remove hydrogen chloride from exhaust gases without discharging waste water.

SUMMARY OF THE INVENTION

An object of the present invention is, therefore, to provide a method for efficiently removing hydrogen chloride from an exhaust gas containing same by means of the so-called wet type purifying process without discharging waste water from the system.

The above object and other objects of the present invention will be made clear from the description given below.

It has been discovered that the above objects can be obtained by bringing a slurry containing calcium carbonate or calcium hydroxide into contact with the exhaust gas to absorb hydrogen chloride from the exhaust gas in the slurry in the form of calcium chloride. The liquid obtained by absorbing hydrogen chloride is cooled after the calcium chloride content of the liquid has reached 40% or more by weight, to form a solid calcium chloride hydrate in the liquid. It has been further discovered that, when the calcium chloride content is more than 50% by weight, the whole liquid solidifies as a $CaCl_2$ hydrate solid.

In the process of the present invention a part of the liquid obtained by absorbing hydrogen chloride is removed from the scrubbing system when the $CaCl_2$ concentration in the liquid is in the range of 15 to 60% by weight. When the $CaCl_2$ concentration in the liquid is 40% or more by weight, the liquid is cooled to 40° C or below, preferably 30° C or below, as is. When the $CaCl_2$ concentration in the liquid does not reach 40% by weight, the liquid is condensed until the concentration reaches 40% or more by weight, and the thus condensed liquid is cooled to 40° C or below, preferably 30° C or below. In this manner a solid of $CaCl_2$ hydrate can be recovered. If the $CaCl_2$ concentration in the liquid is more than 50% by weight, water in the liquid forms water of crystallization, and the whole liquid turns into solid $CaCl_2$ hydrate. If the $CaCl_2$ concentration in the liquid does not reach more than 50% by weight, a $CaCl_2$ hydrate solid and a solution are obtained by cooling the liquid. The filtrate, after separation from the solid, can be used for the formation of a $CaCO_3$ or $Ca(OH)_2$ slurry. Therefore, the present invention provides a method for removing hydrogen chloride from exhaust gases containing same without discharging any waste water at all by recovering hydrogen chloride as a $CaCl_2$ hydrate solid.

DETAILED DESCRIPTION OF THE INVENTION

Figure 1:
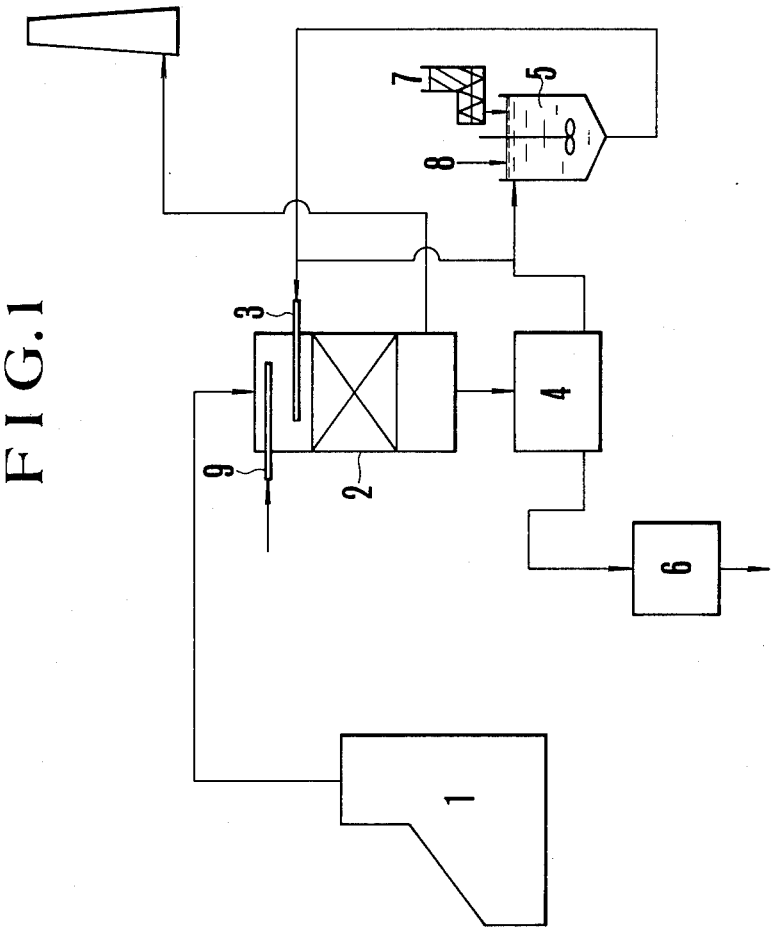
FIG. 1 is a flow diagram showing one embodiment of the present invention wherein an exhaust gas containing hydrogen chloride is brought into contact with a slurry containing calcium carbonate or calcium hydroxide until the calcium chloride content of the liquid reaches more than 50% by weight, and subsequently, a part of the liquid containing more than 50% by weight of calcium chloride is drawn out and cooled to convert it into a calcium chloride hydrate solid which solid is recovered.

In the present invention, an exhaust gas containing hydrogen chloride is first brought into contact with a slurry containing calcium carbonate or calcium hydroxide to absorb hydrogen chloride in the form of calcium chloride in the slurry. The content of calcium carbonate or calcium hydroxide in the slurry can be properly selected by taking into consideration the hydrogen chloride content the exhaust gas, but a preferred content is the amount in which all of calcium carbonate or calcium hydroxide can be converted into calcium chloride by one contact between the slurry and the exhaust gas. More particularly, a preferred content is in the range of 0.001 to 5% by weight, more preferably 0.01 to 2% by weight. Further, in bringing the exhaust gas into contact with the slurry, both are introduced into an absorbing tower. If necessary, two or more absorbing towers may be used. Further, in bringing the exhaust gas into contact with the slurry, the temperature of the slurry is usually kept at 50° C or higher. Since the temperature of the exhaust gas is usually 200° to 1200° C or thereabout, the temperature of the slurry can be kept at 50° C or higher merely by bringing the exhaust gas into contact with the slurry. In this way, an exhaust gas from which hydrogen chloride has been removed by contact with the slurry can be discharged into the atmosphere.

When an exhaust gas containing hydrogen chloride is brought into contact with a slurry containing calcium carbonate or calcium hydroxide, a calcium chloride is formed by a reaction between the calcium carbonate or calcium hydroxide and hydrogen chloride, and the calcium chloride dissolves. Until the calcium chloride concentration reaches 15 to 60% by weight, calcium carbonate or calcium hydroxide is fed to one or more absorbing towers to absorb hydrogen chloride.

As explained above, when the calcium chloride concentration in the liquid has reached a range between 15 to 60% by weight, a part of the liquid is drawn out. The remaining part of the liquid is blended with water as well as calcium carbonate or calcium hydroxide to prepare a new slurry which is allowed to recycle for the absorption of hydrogen chloride. Further, in the liquid, the maximum amount of calcium chloride that can be dissolved at 50° C is about 57% by weight and at 70° C about 60% by weight. When the above liquid drawn out of the absorbers contains 40% or more by weight of calcium chloride, the liquid is cooled to 40° C or below as is. In this case, where the liquid is cooled to about 40° C, calcium chloride is first deposited in the form of tetrahydrate in the liquid, and when cooled to about 25° C, calcium chloride is deposited in the form of hexahydrate in the liquid. If the separated liquid contains less than 40% by weight of calcium chloride, the liquid must be condensed so that the liquid will contain 40% or more by weight of calcium chloride, and then the condensed liquid is cooled to 40° C or below as stated above. In cooling the liquid as above, when the calcium chloride concentration in the liquid is more than 50% by weight, the whole liquid solidifies as a calcium chloride hydrate solid, with no excess water to separate. On the other hand, when the concentration of calcium chloride in the liquid is 40 to 50% by weight, a calcium chloride hydrate solid is formed by cooling the liquid with excess water left over. The solution left-over is separated from the solid and the separated solution is re-used to prepare a new slurry containing calcium carbonate or calcium hydroxide, and the slurry is recycled for absorption of hydrogen chloride. In the present invention, therefore, there is no water which must be treated as a waste water. After contact between the exhaust gas and the slurry, the hydrogen chloride content in the exhaust gas is reduced to 5 ppm or below.

The exhaust gas sometimes contains sulfur dioxide in addition to hydrogen chloride. When an exhaust gas containing sulfur dioxide and hydrogen chloride is treated according to the method of the present invention, the sulfur dioxide can also be effectively removed together with the hydrogen chloride from the exhaust gas. The hydrogen chloride being absorbed in the form of calcium chloride and at the same time the sulfur dioxide is absorbed in the form of calcium sulfite which forms a precipitate. If a liquid containing the calcium sulfite thus precipitated and calcium chloride is cooled according to the present invention, calcium sulfite and calcium chloride hydrate solids can be recovered. The calcium sulfite is first separated by filtration and then, by cooling the resulting filtrate, calcium sulfite and calcium chloride hydrate solids can be separately recovered.

In FIG. 1, 1 is an incinerator and 2 an absorbing tower. A combustion exhaust gas from the incinerator 1 is, if necessary, subjected to dust-removing the heat-recovering treatments, and is introduced into the absorbing tower 2. The temperature of the exhaust gas fed to the absorbing tower 2 is not uniform, but usually 200° to 1000° C. Therefore, the temperature of a slurry containing calcium carbonate or calcium hydroxide, which comes into contact with the exhaust gas, can be kept easily at 50° C or higher. When the exhaust gas is from a municipal refuse incinerator, it contains usually 500 to 1000 ppm of hydrogen chloride and when the exhaust gas is from an exclusive burning of polyvinyl chloride resin waste, it contains 20,000 to 30,000 ppm of hydrogen chloride.

The high temperature exhaust gas containing hydrogen chloride is introduced into the absorbing tower 2, where the exhaust gas is brought into contact with a slurry containing calcium carbonate or calcium hydroxide, which is fed from a pipe 3, and the exhaust gas is then cooled and at the same time an absorption of the hydrogen chloride contained in the exhaust gas is effected. After the contact with the slurry, the exhaust gas is cooled to 80° to 100° C and the hydrogen chloride content in the exhaust gas is reduced to 5 ppm or below.

The liquid obtained by absorbing hydrogen chloride in the absorbing tower 2 is stored in a receiving tank 4 and a part of the liquid is sent to a preparing tank 5 where calcium carbonate or calcium hydroxide and, if necessary, water are added thereto to prepare a new slurry having refreshed absorbing ability and then the new slurry is allowed to circulate through the absorbing tower 2 together with the remaining part of the liquid. The liquid coming out of the absorbing tower 2 has a temperature of 80° to 100° C and a pH of 6 to 7. When the content of calcium chloride which is formed in the course of the cyclic absorbing process has reached 51% or more, a part of the liquid is drawn out of the receiving tank 4 and sent to a cooling tank 6 and the remaining part of the liquid is recycled to the absorbing tower 2. The portion of the liquid from tank 4 be recycled is transferred to a tank 5, where calcium carbonate or calcium hydroxide is added thereto from 7 and water is added as indicated at 8, and the resulting admixture is blended with the remaining portion of the recirculating absorbent liquid to prepare a slurry containing 0.001 to 5% by weight of calcium carbonate or calcium hydroxide. By cooling the liquid, fed into the cooling tank 6, to 40° C or below, the whole liquid can be separated as a calcium chloride hydrate solid, which leaves no waste water at all.

Figure 2:
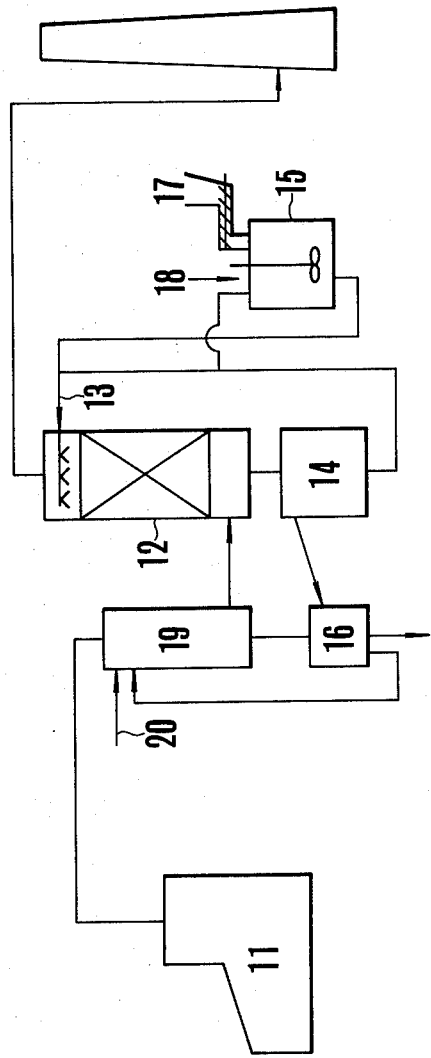
FIG. 2 is a flow diagram showing another embodiment of the present invention wherein an exhaust gas containing hydrogen chloride is brought into contact with a slurry containing calcium carbonate or calcium hydroxide until the calcium chloride content reaches 15 to 40 % by weight, and a part of the liquid containing 15 to 40 % by weight of calcium chloride is drawn out and then concentrated until the calcium chloride content of the liquid reaches more than 50% by weight, and after concentration, the liquid containing more than 50% by weight of calcium chloride is cooled for conversion to a calcium chloride hydrate solid which solid is recovered.

In FIG. 2, 11 is a incinerator, 12 an absorbing tower, 13 a slurry conduit pipe, 14 a receiving tank, 15 a preparing tank, 16 a cooling tank, 17 a feeding machine, 18 water and 19 a moistening-cooling tower. A combustion exhaust gas from the incinerator 11 is fed to the absorbing tower 12 through the moistening-cooling tower 19. Subsequently, as in the process of FIG. 1, a part of the liquid is introduced into the cooling tank 16, when the calcium chloride content in the liquid in the receiving tank 14 has reached 15 to 40% by weight. The liquid from tank 16 is recirculated through the moistening-cooling tower 19 where the liquid is brought into contact with the high temperature exhaust gas from the incinerator 11 and thereby concentrated to a calcium chloride content of more than 50% by weight. The thus obtained liquid containing more than 50% by weight of calcium chloride is cooled to 40° C or below, whereby the liquid contents into a calcium chloride hydrate solid.

Figure 3:
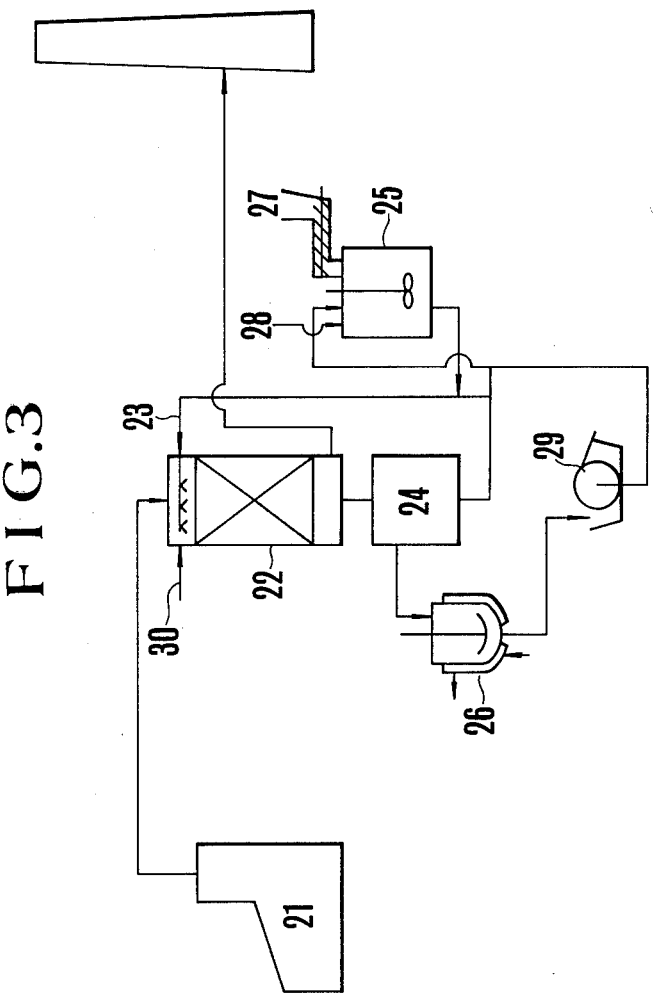
FIG. 3 is a flow diagram showing set another embodiment of the process of the present invention wherein an exhaust gas containing hydrogen chloride is brought into contact with a slurry containing calcium carbonate or calcium hydroxide until the calcium chloride content of the liquid reaches 40 to 50% by weight, and a part of the liquid containing 40 to 50 % by weight calcium chloride is drawn out and cooled to form a calcium chloride hydrate solid in the liquid and then the solid is separated from the liquid to recover the calcium chloride hydrate solid and the filtrate is recycled.

In FIG. 3, 21 is an incinerator, 22 an absorbing tower, 23 a slurry conduit pipe, 24 a receiving tank, 25 a preparing tank, 26 a cooling tank, 27 a feeding machine, 28 water and 29 a filter. A combustion exhaust gas from the incinerator 21 is introduced into the absorbing tower 22. Next, as in the process of FIG. 1, a part of the liquid is fed to the cooling tank 26 for cooling when the calcium chloride content in the liquid in the receiving tank 24 has reached 40 to 50% by weight, and the resulting calcium chloride hydrate solid precipitate is removed by the filter 29, thereby recovered. The filtrate thus obtained is transferred to the preparing tank 25.

As is apparent from the above description, water discharged from the system in the practice of the method of the present invention, is solely in the form of water of crystallization in the calcium chloride hydrate solid to be recovered and in the form of aqueous vapors exiting with the exhaust gas discharged from the absorbing tower. Thus, no waste water is discharged out of the system. Water in an amount equivalent to the amount of water discharged in the form of the water of crystallization or the aqueous vapors out of the system may be supplemented in any place within the system, but preferably is introduced, in an amount equivalent to the amount of the aqueous vapors, to the absorbing tower and and, in an amount equivalent to the amount of the water of crystallization, to the preparing tank. Thus, in FIG. 1, 9 is a feeding pipe for introducing make-up water to the absorbing tower 2; in FIG. 2, numeral 20 is a feeding pipe for the make-up water to the moistening-cooling tower 19; and in FIG. 3, numeral 30 is a feeding pipe for the make-up water to the absorbing tower 22.

The present invention will be further explained in more detail by way of Examples given below, but the present invention should not intended to be limited to these Examples.

EXAMPLE 1

The Example is illustrated by way of FIG. 1.

Ten thousand $Nm^3/h$ of a combustion exhaust gas having a temperature of 300° C and containing 1500 ppm of hydrogen chloride was introduced into the absorbing tower 2, where the exhaust gas was brought into contact with a slurry having a temperature of 73° C and containing calcium carbonate, to absorb hydrogen chloride into the slurry. The slurry containing calcium carbonate was allowed to recirculate through the absorbing tower 2 to form a liquid containing more than 50% by weight of calcium chloride, and then a part of the liquid thus obtained was drawn out in the amount of 555 kg/h from the receiving tank 4 beneath the absorbing tower 2. The remaining part of the liquid was blended with 25 kg/h of calcium carbonate and 70 kg/h of water, and the calcium carbonate concentration in the liquid coming into the absorbing tower 2 was adjusted at 0.5% by weight and the liquid was recirculated through the absorbing tower 2. The concentration of hydrogen chloride in the gas coming out of the absorbing tower 2 was 5 ppm or less.

The liquid drawn out of the receiving tank 4 was cooled to 25° C in the cooling tank 6, whereby the whole liquid turned into a calcium chloride hydrate solid.

EXAMPLE 2

This Example is illustrated by way of FIG. 2.

Seven thousand five hundred $NM^3/h$ of a combustion exhaust gas having a temperature of 1000° C and containing 15,000 ppm of hydrogen chloride was passed through the moistening-cooling tower 19 to obtain a gas having a temperature of 95° C, and the thus cooled gas was then fed to the absorbing tower 12 where it was brought into contact with a slurry containing calcium carbonate to absorb hydrogen chloride into the slurry.

The slurry containing calcium carbonate was allowed to recirculate through the absorbing tower 12 to obtain a liquid containing 25% by weight of calcium chloride and thereafter, a part of the liquid thus obtained was drawn out in the amount of 1,115 kg/h from the receiving tank 14 beneath the absorbing tower 12 to the cooling tank 16. The remaining part of the liquid was blended with 1,037 kg/h of slurry containing 26% by weight calcium carbonate, and the concentration of calcium carbonate in the liquid coming into the absorbing tower 12 was adjusted to 1.5% by weight and the liquid was recirculated through the absorbing tower 12.

The liquid drawn out from the receiving tank 14 was brought into contact with 7,500 $Nm^3/h$ of a combustion exhaust gas having a temperature of 1000° C and 952 kg/h a water spray in the moistening-cooling tower 19, and concentrated until the concentration of calcium chloride in the liquid reached 51% by weight. The liquid thus concentrated was then transferred to the cooling tank 16 to cool it to 25° C, thereby the whole of the liquid turned into a calcium chloride hydrate solid.

As described above, after the exhaust gas was treated with the slurry containing calcium carbonate, the concentration of hydrogen chloride in the gas discharged from the absorbing tower 12 was 5 ppm or below.

EXAMPLE 3

This Example is illustrated by FIG. 3.

One thousand $Nm^3/h$ of a combustion exhaust gas having a temperature of 800° C and containing 5000 ppm of hydrogen chloride was fed to the absorbing tower 22, where absorption of hydrogen chloride was effected by spraying water and a liquid recirculating through the absorbing tower 22 so that the temperature of the exhaust gas would drop to 72° to 75° C. As a result, the concentration of hydrogen chloride in the gas discharged from the absorbing tower 22 was about 3 ppm.

In this case, the amount of water used was 420 kg/h, which is equivalent to the amount of water exiting with the gas discharged from the absorbing tower 22.

From the receiving tank 24 was removed a first stream amounting to 110.9 kg/h. The remaining part of the liquid was blended with 104.3 kg/h of a slurry containing 10.7% by weight of calcium carbonate, and the concentration of calcium carbonate in the liquid coming into the absorbing tower 22 was adjusted to 0.5% by weight and the liquid thus adjusted was allowed to recirculate through the absorbing tower 22. The first liquid stream leaving the receiving tank 24 was filtered to remove dust and then cooled to 20° C, thereby yielding a calcium chloride hydrate solid, which was separated in the amount of 33.2 kg/h as $CaCl_2 \cdot 6H_2O$. The filtrate obtained by the separation was transferred to the slurry-preparing tank 25 for the preparation of a slurry containing calcium carbonate, together with 17.1 kg/h of water which is equivalent to the amount of water removed from the system by the separation of $CaCl_2 \cdot 6H_2O$, and was used for the preparation of the slurry containing calcium carbonate.

What is claimed is:

1. A method for removing hydrogen chloride from an exhaust gas comprising:
    circulating a slurry containing calcium carbonate or calcium hydroxide in a path through a contact zone wherein said slurry is brought into contact with the exhaust gas to absorb hydrogen chloride in the form of calcium chloride, thereby producing a slurry having a temperature of at least 50° C and containing 50 to 60% by weight calcium chloride;
    diverting a portion of said slurry from said circulation path; and
    cooling said slurry portion to 40° C or below to solidify the entire slurry portion in the form of solid calcium chloride hydrate.

2. The method of claim 1 wherein said portion contains less than 50% by weight calcium chloride and additionally comprising concentrating said slurry portion to 50% or more by weight calcium chloride by evaporation of water from said first portion prior to said cooling.

3. The method of claim 1 wherein said first slurry contains 0.001 to 5.0% by weight calcium carbonate or calcium hydroxide.

* * * * *

UNITED STATES PATENT OFFICE
CERTIFICATE OF CORRECTION

Patent No. 4,022,869  Dated May 10, 1977

Inventor(s) Shigeru Saitoh et al.

It is certified that error appears in the above-identified patent and that said Letters Patent are hereby corrected as shown below:

Column 2, line 57, change "set" to --yet--;

Column 3, line 10, after "content" insert --in--;

Column 4, line 55, after "having" insert --a--;

Column 4, line 65, after "tank 4" insert --to--;

Column 4, line 66, after "to the" insert -- preparing --

Column 5, line 25, change "contents" to --converts--;

Signed and Sealed this

Eleventh Day of October 1977

[SEAL]

Attest:

RUTH C. MASON
Attesting Officer

LUTRELLE F. PARKER
Acting Commissioner of Patents and Trademarks